(12) United States Patent
Schleede et al.

(10) Patent No.: US 12,280,796 B1
(45) Date of Patent: Apr. 22, 2025

(54) VEHICLE CONTROL USING AUTO-REGRESSIVE CONTROL DISTIBUTION GENERATION BASED ON WORLD STATE EMBEDDINGS

(71) Applicant: Zoox, Inc., Foster City, CA (US)

(72) Inventors: Peter Scott Schleede, El Dorado Hills, CA (US); Gary Linscott, Seattle, WA (US)

(73) Assignee: Zoox, Inc., Foster City, CA (US)

(*) Notice: Subject to any disclaimer, the term of this patent is extended or adjusted under 35 U.S.C. 154(b) by 261 days.

(21) Appl. No.: 18/071,489

(22) Filed: Nov. 29, 2022

(51) Int. Cl.
*B60W 60/00* (2020.01)
*G05B 13/02* (2006.01)

(52) U.S. Cl.
CPC ......... *B60W 60/001* (2020.02); *G05B 13/027* (2013.01); *B60W 2510/20* (2013.01); *B60W 2520/10* (2013.01); *B60W 2710/20* (2013.01); *B60W 2720/10* (2013.01)

(58) Field of Classification Search
CPC ........... B60W 60/001; B60W 2510/20; B60W 2520/10; B60W 2710/20; B60W 2720/10; G05B 13/027
See application file for complete search history.

(56) References Cited

U.S. PATENT DOCUMENTS 11,003,955 B1* 5/2021 Tan .................. G06V 20/58
2018/0348775 A1* 12/2018 Yu .................... B60W 30/1882

* cited by examiner

Primary Examiner — Calvin Cheung
(74) Attorney, Agent, or Firm — Lee & Hayes, P.C.

(57) ABSTRACT

A machine-learned architecture for generating a single trajectory or multiple trajectories for controlling a vehicle may comprise an embedding model that generates an embedding of a world state indicating environment, object, and/or other states, one or more machine-learned layers that determine a predicted world state embedding using the world state embedding, and concatenating, as combined data, that predicted world state embedding to a steering angle distribution and a velocity distribution. The combined data is provided as input to a machine-learned model (that may be a single machine-learned model or may comprise two separate machine-learned models) that determines a next steering angle distribution and a next velocity distribution. These distributions may be used as part of generating one or more trajectories for controlling the vehicle. The architecture may be iteratively used to create a series of distributions that are used to create one or more trajectories.

20 Claims, 7 Drawing Sheets

VEHICLE CONTROL USING AUTO-REGRESSIVE CONTROL DISTIBUTION GENERATION BASED ON WORLD STATE EMBEDDINGS

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. However, the events and scenarios encountered by an autonomous vehicle may be highly complex, especially in dense urban environments or in extreme weather conditions. Existing solutions may not adequately handle the complexity of such situations while maintaining the ability to compute responses to the environment in real time.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
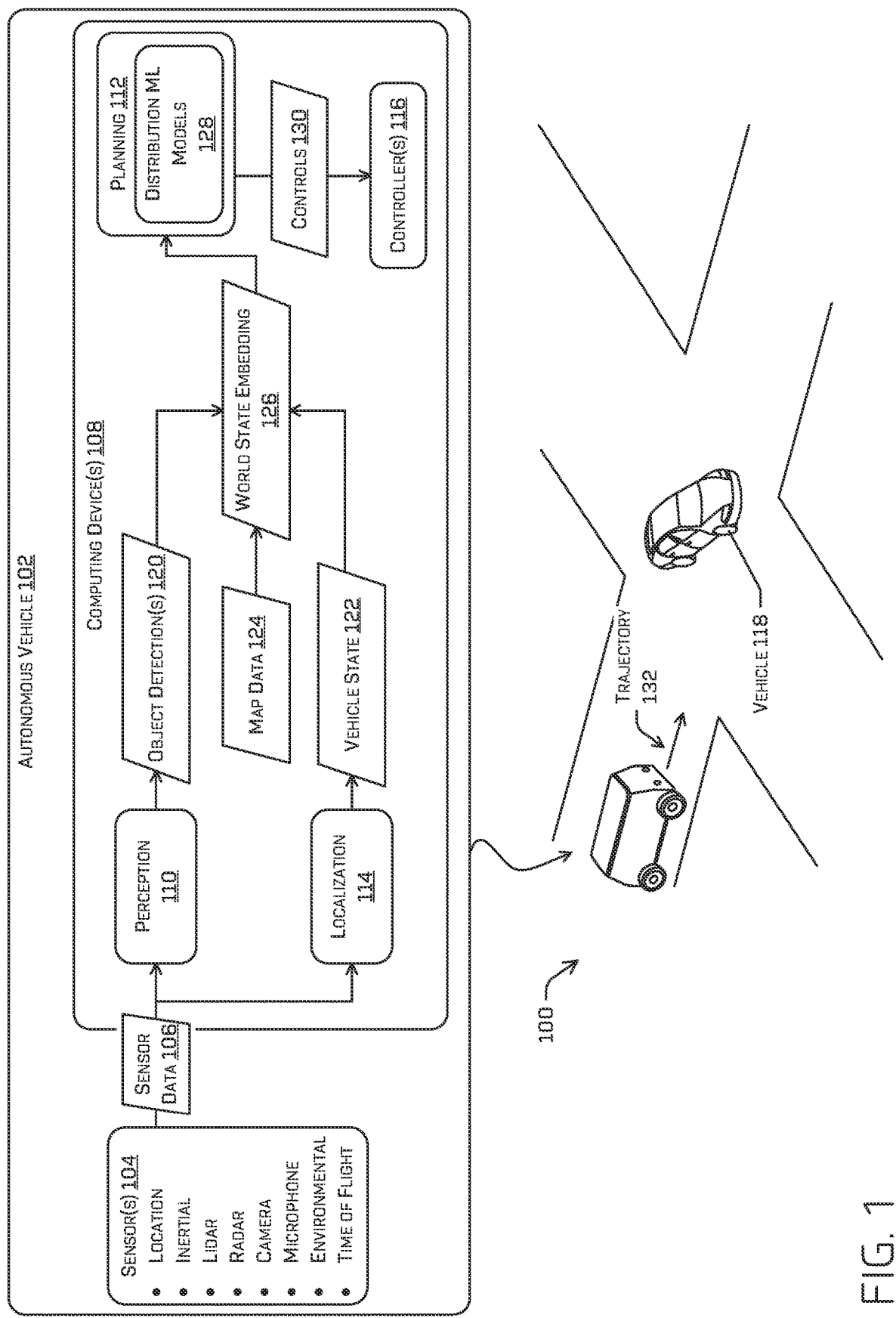
FIG. 1 illustrates an example scenario in which an autonomous vehicle uses the distribution ML models discussed herein to determine controls that a controller may track to generate a trajectory for a vehicle.

As discussed above, existing vehicle automation systems may not be able to handle the complexity of real-world scenarios. This application relates to techniques for a novel machine-learned pipeline that auto-regressively generates controls for the vehicle by generating distributions of two specific controls, rather than determining discrete controls. The distributions generated by the techniques discussed herein may be used to identify a series of discrete controls or multiple series of discrete controls. In other words, the techniques may be used to generate multiple possible trajectories for controlling a vehicle through an environment, increasing the options available the vehicle and potentially increasing the vehicle's ability to autonomously navigate an environment without requiring teleoperations or other input. These techniques allow a vehicle to navigate in more complex situations and to exhibit more complex behavior.

The techniques may include a variety of methods and systems that include using a first machine-learned (ML) model that generates a world state embedding based at least in part on various data determined based at least in part on sensor data. For example, a vehicle may be equipped with a variety of sensors, which the vehicle may use to determine a state of the vehicle itself and to detect object(s) in the environment. These object detection(s) and vehicle state, together with map data determined based on the vehicle's determination of where the vehicle is (using sensor data), may be fed to the first ML model to determine a current world state embedding. Embeddings, generally, are an arbitrary length or size vector/tensor representation of the input data and aren't humanly comprehensible.

The techniques discussed herein include determining a set of controls for each timestep up to a time horizon. For example, the timesteps may be 0.2 seconds and the time horizon may be 2 seconds; 0.5 second timesteps and a 5 or 10 second time horizon; or the like. The set of controls may specify a velocity and steering angle for controlling the vehicle at that particular timestep. For the initial timestep, e.g., 0.2 seconds into the future, the control distributions may be initialized as the current control state of the vehicle, i.e., the current velocity of the vehicle and the current steering angle of the vehicle. These controls may be initialized as very narrow probability distributions, indicating that the vehicle is confident (within tolerances) that these are the current velocity and steering angle. To determine the controls at the first timestep, e.g., 0.2 seconds into the future, the techniques may first update the world state embedding by providing that embedding to one or more ML layer(s) that predict a future world state as indicated by an updated world state embedding.

This world state embedding is concatenated with both the steering angle distribution and the velocity distribution. These respective sets of data are provided (independently) to two different ML models, one to generate a new steering angle distribution and another to generate a new velocity distribution. A first ML model associated with the steering angle may be trained to generate predicted steering logits and a second ML model associated with the velocity may be trained to generate predicted velocity logits. These steering logits and velocity logits may be input into a softmax function (or otherwise evaluated) to determine a steering angle distribution and velocity distribution associated with 0.2 seconds in the future. These distributions may be stored in association with this first timestep so that once distributions for each timestep up to the time horizon have been generated, the series of distributions may be used to generate a trajectory for controlling the vehicle over the time horizon.

For the next timestep, the previously updated world state embedding is, again, processed by the one or more ML layer(s) to generate a new updated world state embedding. This new updated world state embedding is concatenated to the distributions of steering angle and velocity generated for the first timestep and provided to the first and second ML models to generate distributions associated with the second timestep. This process may be repeated until the time horizon is reached.

Once the series of distributions for the timesteps up to the time horizon have been generated, the series of distributions may be used to generate a single trajectory or multiple trajectories. In the single trajectory instance, the most likely steering angle and velocity may be determined from each set of distributions for each timestep and these most likely steering angles and velocities may be provided to a tracking component of a controller to generate control signals for controlling the vehicle sufficient to achieve the steering angles and velocities by the respective timesteps. In some examples, determining a trajectory suitable to accomplish these steering angles and velocities over time may comprise determining a weighted average of the steering angles and velocities over time with larger weights attributed to steering angles and velocities that are earlier within the time period defining the controls up to the time horizon.

In an example where the techniques include determining multiple trajectories, the distributions at each timestep may be randomly sampled and, in some examples, the results averaged to smooth the resultant sampled steering angels and velocities. This process may be repeated for as many trajectories as desired. As will be discussed further herein, the multiple trajectories may be provided to a planning component that may select from the trajectories, use the trajectories as a starting point or as a suggestion, or as part of a tree search algorithm where the trajectories narrow down the number of trajectories to be explored.

The techniques discussed herein may improve a vehicle's ability to navigate complex situations without transmitting a request for input to resolve getting stuck and may increase the sophistication of a vehicle's behavior. In some examples, the techniques may drastically reduce the computational requirements for running a tree search and may enable a tree search with hundreds or thousands of trajectory primitives (basic trajectories that make up building blocks of a larger trajectories) to be computed in real-time, which has so far been impossible without advances in computing speed and memory. Moreover, these factors all work to improve the safety of the vehicle, both to passengers and pedestrians and to the vehicle system itself.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

In at least one example, a sensor may generate sensor data 106 in association with a time, which may be referred to herein as a timestep-a reference to a discrete point in time that is indexed by timesteps. Sensor data may be generated at intervals between timesteps, such as 5 milliseconds, 10 milliseconds, 20 milliseconds, 100 milliseconds, 250 milliseconds, 0.5 seconds, 1 second, 2 seconds, 5 seconds, or any other time interval. In some examples, the frequency of the timesteps may be based at least in part on sensor output, a digital signal processing component, a user-defined parameter, and/or a computing and/or time-keeping component of the vehicle 102. Each timestep of sensor data may include a measurement that will depend on the sensor type. For example, radar, sonar, and/or lidar sensors may output a time between a signal emission and a return; an accelerometer may output a In some examples, the autonomous vehicle 102 may include computing device(s) 108 that may include a perception component 110, a planning component 112, a localization component 114, and/or controller(s) 116, all or some of which may receive sensor data 106 from sensor(s) 104. The sensor(s) 104 may generate sensor data, which may be received by computing device(s) 108. However, in other examples, some or all of the sensor(s) 104 and/or computing device(s) 108 may be separate from and/or disposed remotely from the vehicle 102 and data capture, processing, commands, and/or controls may be communicated to/from the vehicle 102 by one or more remote computing devices via wired and/or wireless networks.

In general, the perception component 110 may determine what is in the environment surrounding the autonomous vehicle 102 and the planning component 112 may determine how to operate the autonomous vehicle 102 according to information received from the perception component 110 regarding the environment. The perception component 110 may include one or more ML models and/or other computer-executable instructions for detecting, identifying, segmenting, classifying, and/or tracking objects from sensor data collected from the environment of the autonomous vehicle 102. The data generated by the perception component 110 in association with a same object may be collectively aggregated into a data structure called an object detection. The object detection may identify a sensor data segmentation, object classification, and/or track associated with an object. The sensor data segmentation may identify a portion of sensor data associated with the object and the object classification may indicate a classification determined by one or more ML models in association with the object, such as "vehicle," "delivery truck," "construction equipment," "pedestrian," "dynamic object," "static object," "signage," "traffic light," and/or the like. The track of the object detection may identify historical object detection data associated with the object, current object detection data, and predicted object detection data. For example, the object detection may further indicate a historical, current, and/or predicted pose (e.g., position and/or heading), velocity, acceleration, and/or state (e.g., parked, drop-off/pick-up in progress, delivery in progress, green light, red light) associated with the object. For example, the object detection(s) may comprise an object detection associated with a vehicle 118 in scenario 100 that may have cut off vehicle 102.

The localization component 114 may use sensor data 106 to determine a location of the vehicle 102 within the environment, which may include a pose (e.g., position and/or orientation) of the vehicle. In some examples, the localization component 114 may use simultaneous localization and mapping (SLAM) techniques to determine such a pose and/or a velocity of the vehicle. In some examples, the localization component 114 (and/or other components of the vehicle) may output this data as vehicle state 122. Vehicle state 122 may further indicate a current velocity of the vehicle and/or current steering angle of the wheel(s), as may be determined based at least in part on wheel encoder data, steering rack sensor data, and/or the like.

The object detection(s) 120 and vehicle state 122 may be aggregated with map data 124 as world state data that may be use to generate a world state embedding 126. The map data 124 may include data indicating a location and extents of roadway(s), signage, static object(s), and/or the like that are within a region that is determined based at least in part on the vehicle state 122, such as the global or regional vehicle location. An ML model (undepicted in FIG. 1 for the sake of clarity) may receive the object detection(s) 120, vehicle state 122, and map data 124 as input and may determine, using that data, a world state embedding 126. In some examples, the object detection(s) 120, vehicle state 122, and map data 124 may be encoded in a data structure, such as a top-down representation of the environment with additional dimensions to identify orientation(s) and or predicted trajectories of the object detection(s) 120. In some examples, the ML model for generating the world state embedding 126 may comprise t-distributed stochastic neighbor embedding (t-SNE), uniform manifold approximation and projection for dimension reduction (UMAP), and/or other similar dimensional reduction and/or embedding projection algorithms sufficient to generate an embedding representing the object detection(s) 120, vehicle state 122, and map data 124.

This world state embedding 126 may be provided to the planning component 112. The planning component may comprise the distribution ML models 128 discussed herein that may generate controls 130 for controlling the vehicle 102, which may include determining a trajectory 132 based at least in part on the controls 130. In particular, the vehicle state 122 may also be provided to the distribution ML models 128 as input to generate initial control distributions, as discussed further herein. The distribution ML models 128 may determine a series of control distributions based at least in part on the initial control distribution determined from the vehicle state 122 and may iteratively update the world state embedding, as discussed further herein. The distribution ML models 128 may determine control distributions associated with each timestep up to a time horizon and these control distributions may be used to determine controls 130, according to the techniques discussed herein.

The planning component 112 may use the perception data received from perception component 110, such as controls distributions, a series of controls distributions, or multiple trajectories from the distribution ML models 128, to determine a trajectory 132 for controlling motion of the vehicle 102 to traverse a path or route, and/or otherwise control operation of the vehicle 102. For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, 100 milliseconds, half a second, 6 seconds, any other number) based at least in part on the control distributions or series of control distributions to control the vehicle to traverse the route (e.g., in order to avoid any of the detected objects); and select one of the potential trajectories as a trajectory 132 that may be used to generate a drive control signal that may be transmitted to controller(s) 116 of the vehicle 102. In some examples, the planning component 112 may comprise a tree search that uses the control distributions, series of control distributions, or trajectory(ies) determined based at least in part on the control distributions or series of control distributions. FIG. 1 depicts an example portion of such a trajectory 132, represented as an arrow indicating a heading, velocity, and/or acceleration, although the trajectory itself may comprise instructions for controller(s) of the vehicle 102, which may, in turn, actuate a drive system of the vehicle 102. In various examples discussed herein, such a trajectory may comprise a sequence of desired waypoints associated with a desired vehicle state (position, velocity, heading, etc.) and/or associated controls to be actuated (e.g., acceleration, steering angle, etc.).

Example System

Figure 2:
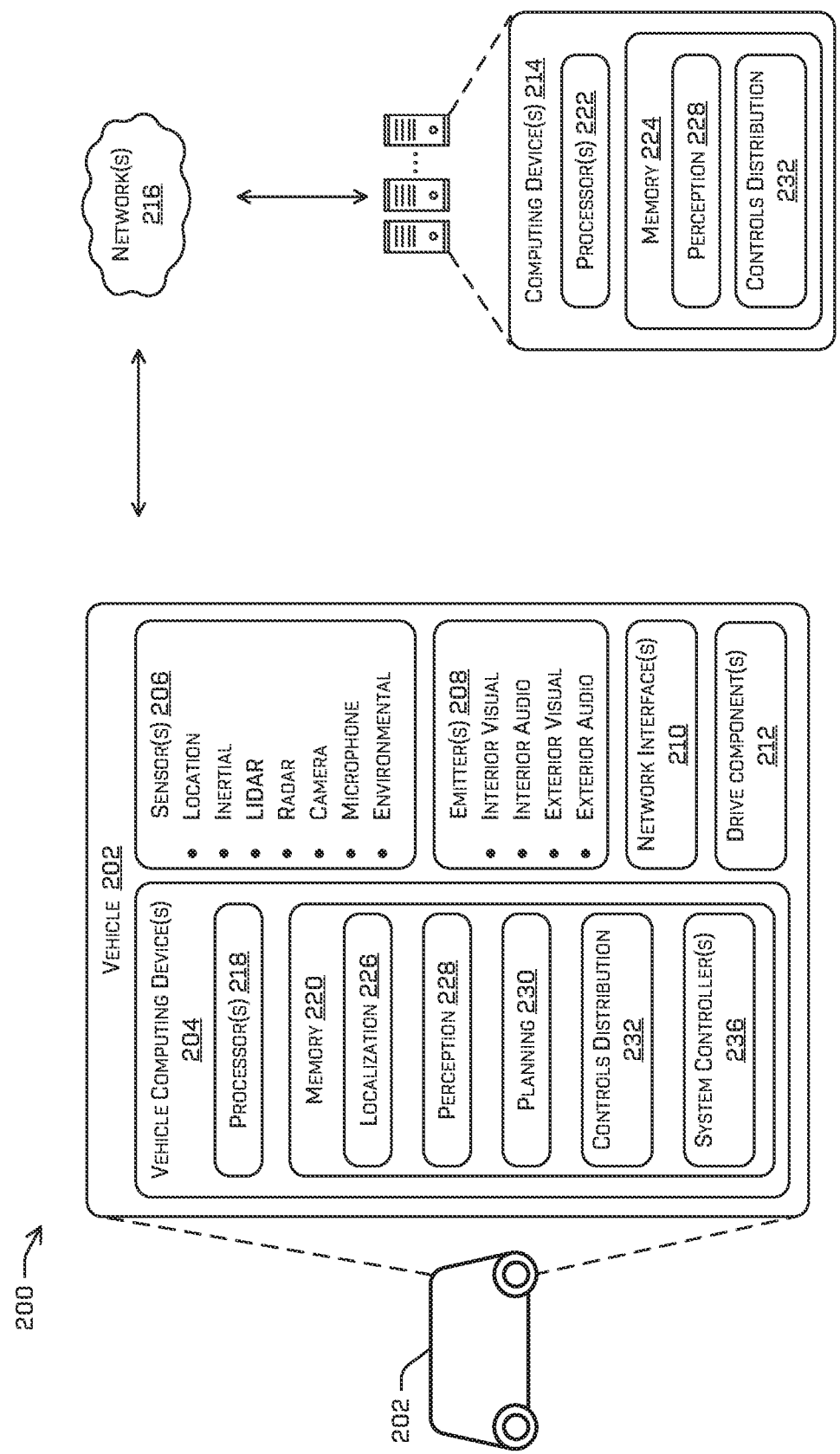
FIG. 2 illustrates a block diagram of an example system comprising distribution ML models that realize the improvements discussed herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 108 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, controls distribution component 232 and/or system controller(s) 236. Perception component 228 may represent perception component 110, planning component 230 may represent planning component 112, and/or controls distribution component 232 may represent distribution ML model(s) 128 and/or at least part of example architecture 300. The memory 220 may additionally or alternatively comprise map(s), which are unillustrated.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the controls distribution component 232, a location and/or orientation of the vehicle 202 relative to the environment and/or sensor data associated therewith.

In some instances, perception component 228 may comprise a primary perception system and/or a prediction system implemented in hardware and/or software. The perception component 228 may comprise one or more perception pipelines that may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

In some examples, the controls distribution component 232 may comprise an embedding model for generating the world state embedding, one or more ML layer(s) for predicting an updated world state embedding, a first ML model for predicting a steering angle probability distribution using a concatenation of the last steering angle probability distribution to the most recently updated world state embedding, and a second ML model for predicting a velocity probability distribution using a concatenation of the last velocity probability distribution to the most recently updated world state embedding. Each of these layer(s) and models may be different models and may comprise different ML architectures, training, etc. In some examples, the controls distribution component 232 may further comprise a softmax layer for generating a distribution based at least in part on a vector/tensor of logits output by the first ML model and/or the second ML model. Additionally or alternatively, the controls distribution component 232 may comprise a trajectory generation layer that determines an argmax associated with a probability distribution, a sampling layer that determines a random sample from a probability distribution, and/or a smoothing layer that may determine a weighted average of randomly sampled controls. Additional details of example controls distribution systems 232 are discussed in more detail in FIGS. 3 and 5.

The memory 220 and/or 224 may additionally or alternatively store a mapping system (e.g., generating a map based at least in part on sensor data), a planning system, a ride management system, etc. Although localization component 226, perception component 228, planning component 230, controls distribution component 232, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the controls distribution component 232, and/or other components of the system 200 may comprise one or more ML models. For example, the localization component 226, the perception component 228, the planning component 230, and/or the controls distribution component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like or visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like. and the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Controls Distribution Architecture and Training

Figure 3:
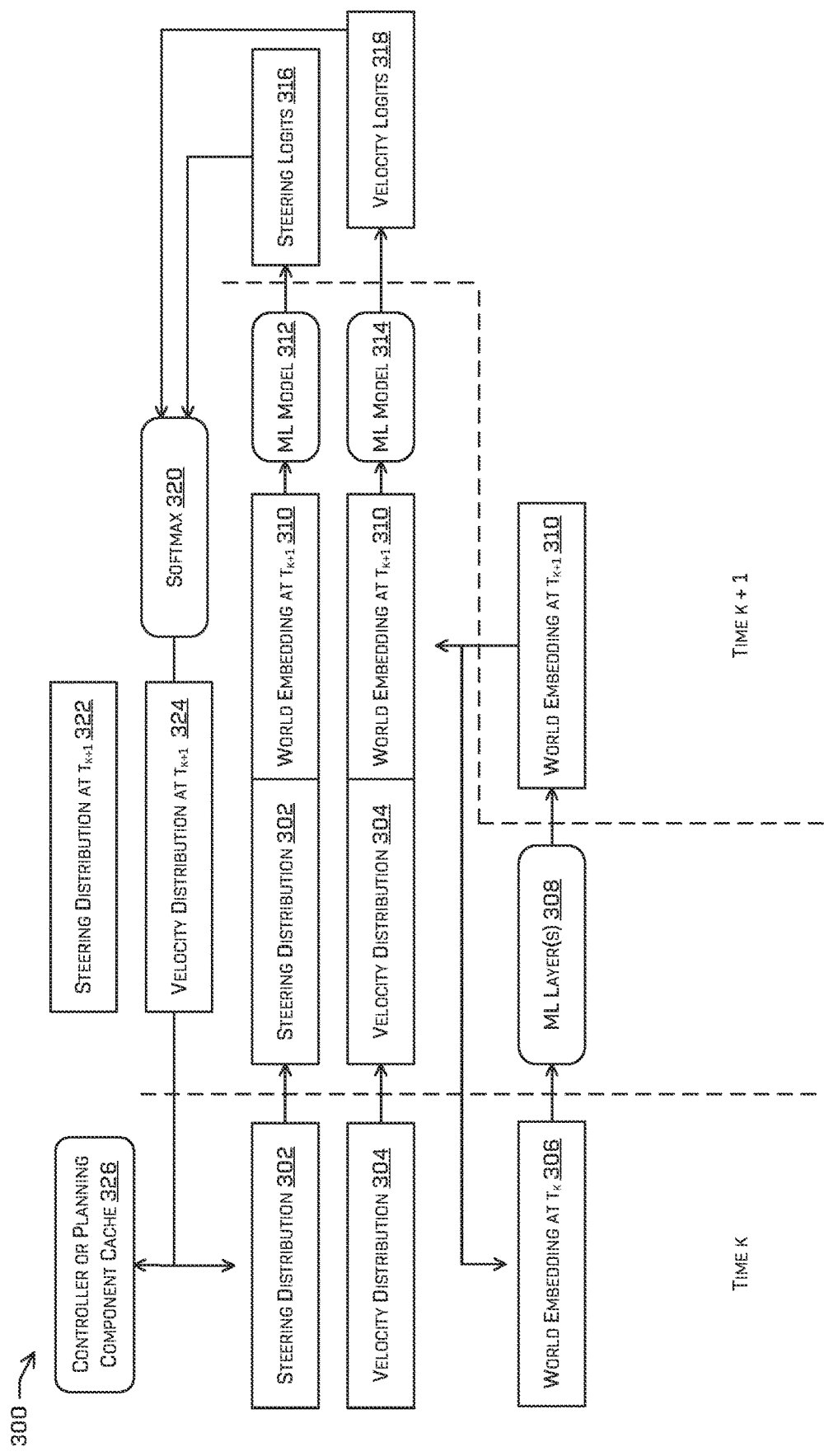
FIG. 3 illustrates a block diagram of an example auto-regressive controls distribution generation architecture.

FIG. 3 illustrates a block diagram of an example autoregressive controls distribution generation architecture, i.e., the example architecture 300. This example architecture 300 may be executed by a perception component, localization component, and/or planning component of a vehicle, such as vehicle 102. In additional or alternate examples, these operations may be executed at a remote computing device as part of the training for the ML layer(s) and models discussed herein. Note that, although a steering angle distribution and velocity distribution are discussed below, any other state distribution is contemplating including, but not limited to, a distribution for the x-position of the vehicle, a distribution for the y-position, and/or a distribution for a heading of the vehicle may additionally be determined. In such an example, the training may further include determining a loss for each and any of these distributions that are also generated.

The example architecture 300 may include various components sufficient to generate distributions for two key controls, rather than discrete control instructions themselves. For example, the example architecture 300 may include various components for generating a steering angle distribution 302 (also called a steering distribution herein) and a velocity distribution 304. Each of these distributions may be a probability distribution over the minimum and maximum values associated with each of these controls. For example, the steering distribution 302 may indicate different probabilities associated with different steering angles within the range of minimum and maximum steering angles achievable by a steering rack of the vehicle. Similarly, the velocity distribution 304 may indicate different probabilities associated with different possible velocities up to a legal maximum velocity that may be determined based at least in part on localization data determined by a localization component of the vehicle. See FIGS. 5A and 5B, which illustrate example distributions. Of course, though depicted as a steering and velocity control for illustrative purposes, the architecture is not meant to be so limiting. As non-limiting examples, such an architecture may have more or less controls or vehicle states (e.g., accelerations, torques, voltages, etc.), different sets or subsets of controls, or otherwise. Moreover, for the sake of training, the architecture may additionally or alternatively predict distributions for position, heading, and/or the like, which may further increase the accuracy of the architecture discussed herein.

The example architecture 300 may receive a world state embedding associated with a time, k, abbreviated for the sake of space in FIG. 3 as world embedding 306. At an initial timestep, k=0, the world embedding 306. In some examples, an embedding model that isn't illustrated in FIG. 3 may generating the world embedding 306 based at least in part on object detection(s) received from the perception component, map data, and a current state of the vehicle, such as a pose (e.g., position and orientation) and location of the vehicle of the vehicle within the map data. For subsequent timesteps, k>0, the world embedding 306 may be the world embedding generated for the last timestep. For example, at timestep k=2 (e.g., 0.4 seconds in the future, 1 second in the future, or the like, depending on how the time horizon is divided), the world embedding 306 may be the world embedding generated by the ML layer(s) 308 as a prediction for timestep k=1. Regardless, the ML layer(s) 308 may be trained to generate a prediction of the world state at timestep k+1, updated world state embedding 310. At a next iteration of the process, this updated world state embedding 310 will be used as the world state embedding 306.

The ML layer(s) 308 may be trained by determining a difference between the embedding output by the ML layer(s) 308 and a ground truth embedding determined based on log data for the future time. For example, log data may indicate a series of object detection(s), map data, and a vehicle state. Embeddings may be generated for each timestep within the series and used as ground truth for determining a loss. The loss may be determined based at least in part on as difference between the embedding output by the ML layer(s) 308 for time k+1 (generated based on an input embedding associated with time k) and the ground truth embedding that was based on log data. The loss may be used to adjust parameter(s) of the ML layer(s) 308 to reduce the loss, thereby increasing the accuracy of the ML layer(s) to predict an accurate world state embedding.

The world state embedding 310 (associated with time k+1) may be concatenated to the steering distribution 302 and the velocity distribution 304, both of which are associated with time k. For the initial timestep, k=0, the steering distribution 302 and the velocity distribution 304 may be initialized as a one-hot vector indicating the current steering angle and velocity of the vehicle, as determined based at least in part on sensor data. For subsequent timesteps, the steering distribution 302 and the velocity distribution 304 are the distributions output at the last timestep. For example, where k=2, the world embedding 310 is associated with time t=3 and the steering distribution 302 and the velocity distribution 304 are associated with time t=2.

For ease of reference, the concatenation of the world state embedding 310 with steering distribution 302 and the concatenation of the world state embedding 310 with velocity distribution 304 are referred to collectively herein as the combined data. The combined data is input (separately) to two different ML models, first ML model 312 and second ML model 314. The first ML model 312 is trained to output steering angle logits 316 based at least in part on the steering distribution 302 and the world embedding 310 and the second ML model 314 is trained to output velocity logits 318 based at least in part on the velocity distribution 304 and the world embedding 310. In an additional or alternate example, the steering distribution may be concatenated with the velocity distribution 304 and the updated world state embedding 310 and provided as input to a single ML model that predicts both the steering logits 316 and the velocity logits 318 (instead of two separate ML models 312 and 314).

The training for the first ML model 312 and the second ML model 314 may comprise determining steering angle data and velocity data from log data received from a vehicle and using such data as ground truth data for determining a first loss for the first ML model 312 (using the steering angle log data compared to the predicted steering logits output by the first ML model 312) and a second loss for the second ML model 314 (using the velocity log data compared to the predicted velocity logits output by the second ML model 314). For the sake of training, the steering logits and velocity logits 318 may be converted to distributions using a softmax layer and a maximum of the distributions may be used to determine a maximally likely steering angle and velocity for the distribution that may be used to determine the respective losses. In an additional or alternate example, determining the loss may comprise cross-entropy sampling and/or determining an average cross-entropy loss across the series of distributions using the ground truth controls indicated in log data received form a vehicle. In such an example, the cross-entropy losses may be determined such that the cross-entropy true probability is given by the ground truth controls indicated in the log data and the given distribution is the velocity distribution or the steering controls distribution. These cross entropies may be averaged and weighted, where earlier (closer to t=0) average cross-entropy losses may be weighted more heavily, as they may be more important and/or accurate. The first loss may be used to alter parameter(s) of the first ML model 312 to reduce the first loss and the second loss may be used to alter parameter(s) of the second ML model 314 to reduce the second loss.

Once the ML models 312 and 314 have output the steering logits 316 and velocity logits 318, respectively, the logits may be fed through a softmax layer 320 to determine a new steering distribution 322 and new velocity distribution 324 associated with time t=k+1. These distributions 322 and 324 may be stored in a controller and/or planning component cache 326 as part of a series of steering distributions and velocity distributions that are being generated for timesteps up to a time horizon. Moreover, the distributions 322 and 324 may be used in a next step, replacing steering distribution 302 and velocity distribution 304.

Once the last timestep has been reached, the cache 326 may store a group of distributions that indicate different steering and velocity distributions associated with each timesteps. As will be discussed herein, a controller or planning component may use a steering and velocity distribution as part of a process for generating a trajectory for controlling a vehicle.

Example Alternate Architecture

Figure 4:
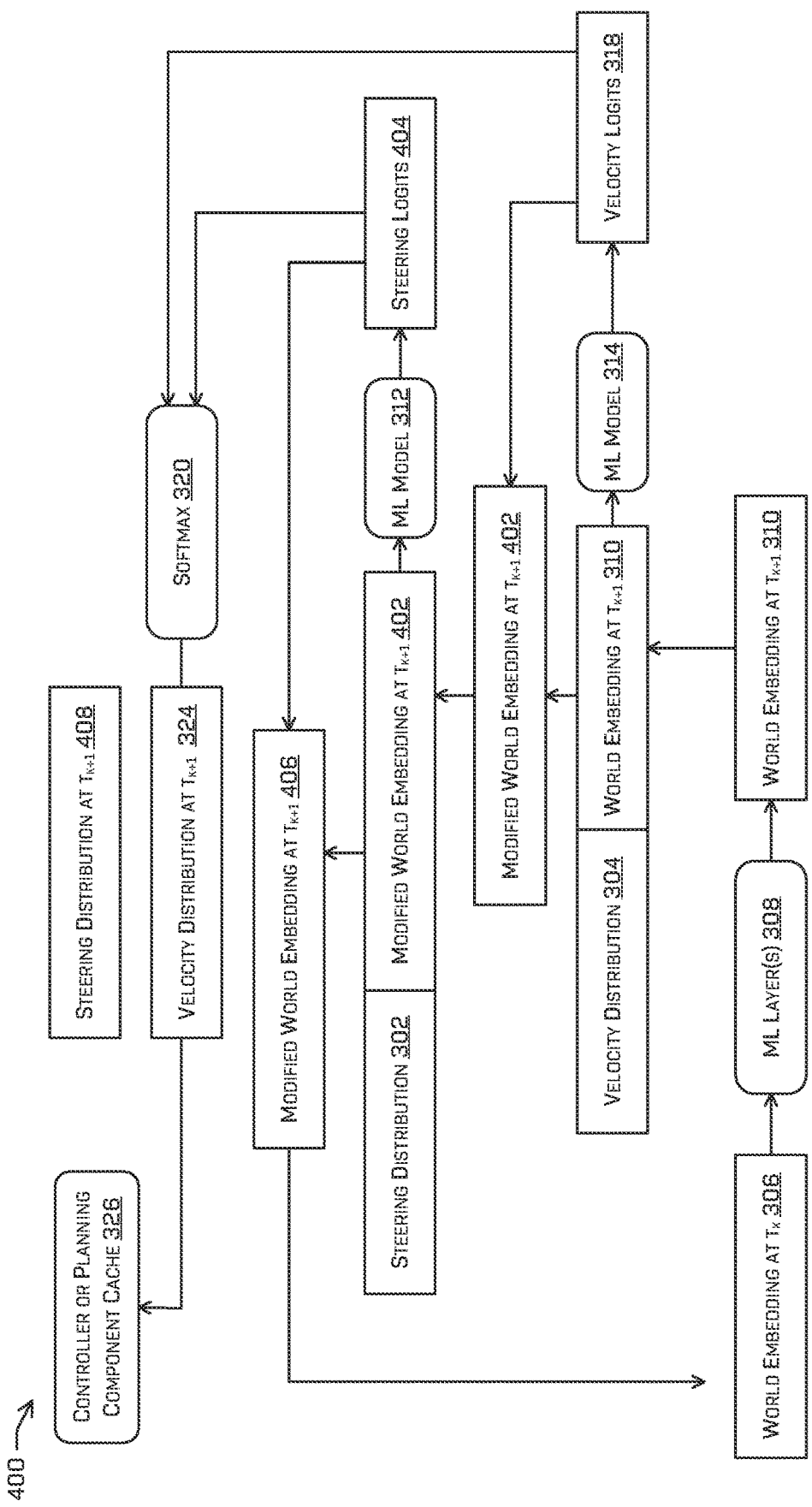
FIG. 4 illustrates a block diagram of an alternate example auto-regressive controls distribution generation architecture.

FIG. 4 depicts block diagram of an alternate example auto-regressive controls distribution generation architecture, i.e., the example architecture 400. This example architecture 400 may be executed by a perception component, localization component, and/or planning component of a vehicle, such as vehicle 102. In additional or alternate examples, these operations may be executed at a remote computing device as part of the training for the ML layer(s) and models discussed herein. Note that, although a steering angle distribution and velocity distribution are discussed below, a distribution for the x-position of the vehicle, a distribution for the y-position, and/or a distribution for a heading of the vehicle may additionally be determined. In such an example, the training may further include determining a loss for each and any of these distributions that are also generated. In some examples, the position and heading may be used to modify the world state embedding similarly to the velocity and steering logits as discussed below. In such an instance, the position and/or heading logits would be generated after the steering logits and used to modify the modified world state embedding 406.

The example architecture 400 may comprise same or similar features to example architecture 300, such as the ML layer(s) 308, ML model 312, ML model 314, softmax layer 320, controller and/or planning component cache 326, and/or the like. Moreover, the world state embeddings, steering distributions, and velocity distributions determined thereby may be recursively used in subsequent iterations of executions of the architecture. The difference with example architecture 400 is that once the velocity logits 318 are determined by the ML model 314 using the velocity distribution 304 concatenated with the updated world state embedding 310, the velocity logits 318 may be used to modify the world state embedding 310 as modified world state embedding 402.

For example, the modified world state embedding 402 may comprise the updated world state embedding 310 concatenated with the velocity logits 318. In an additional or alternate example, the modified world state embedding 402 may be determined based at least in part on a machine-learned model that receives the world state embedding 310 and velocity logits 318 as input and determines a modification to the world state embedding 310 that may be applied to the world state embedding 310 to achieve the modified world state embedding 402 or that machine-learned model may directly predict the modified world state embedding 402 itself. Additionally or alternatively, the velocity logits may be used to determine the minimum and maximum steering angle to constrain the output of the ML model 312. For example, the greater the velocity the lower the steering angle achievable by the vehicle. This may be determined by determining a maximally likely velocity, as indicated by the velocity logits 318.

The steering distribution 302 may be concatenated with the modified world state embedding 402 and provided as input to ML model 312, which may determine steering logits 404. The steering logits 404 and velocity logits 318 may be provided to a softmax function 320 or otherwise operated on to determine velocity distribution 324 and steering distribution 408, similar to the discussion above regarding example architecture 320. One more difference may include that the steering logits 404 may be used to further modify the modified world state embedding 402, as modified world state embedding 406, before recursively using the modified world state embedding 406 for the next iteration of the process.

In some examples, the modified world state embedding 406 may be determined based at least in part on concatenating the modified world state embedding 406 with the steering logits 404. Additionally or alternatively, modified world state embedding 406 may be determined based at least in part on a machine-learned model that receives the modified world state embedding 402 and steering logits 404 as input and determines a modification to the modified world state embedding 402 that may be applied to the modified world state embedding 402 to achieve the modified world state embedding 406 or that machine-learned model may directly predict the modified world state embedding 406 itself using the modified world embedding 402 and the steering logits 404.

Example Steering Angle Distribution and Velocity Distribution

Figure 5A:
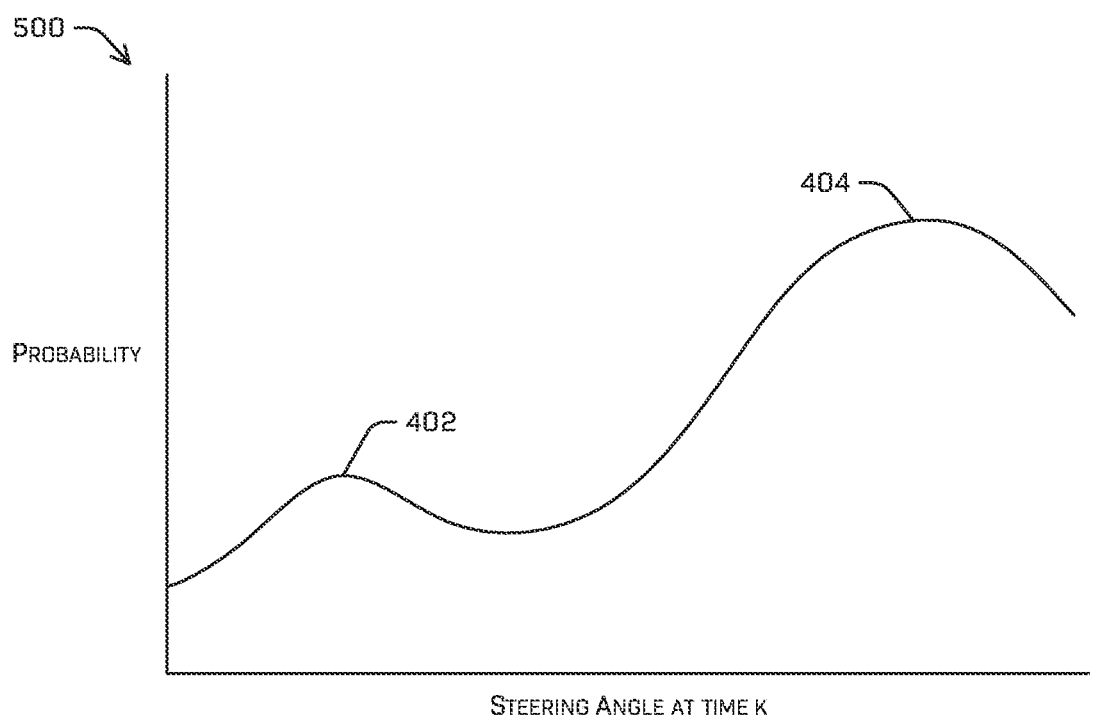
FIG. 5A illustrates an example graph of a steering angle distribution that may be generated by the controls distribution generation architecture as part of auto-regressive control generation described herein.

FIG. 5A illustrates an example graph 500 of a steering angle distribution that may be generated by the controls distribution generation architecture as part of auto-regressive control generation described herein. The example graph 500 depicts a probability distribution that demonstrates a first local maximum 502 and a second local maximum 504, which may indicate that there's a moderate probability of turning slightly left and a larger probability of turning right. Note, also, that the furthest left point in the probability distribution may be associated with a maximally achievable leftward steering angle and the point at which the probability distribution ends on the right may be associated with a maximally achievable rightward steering angle. In some examples, multiple trajectories may be determined by determining local maxima indicated by the probability distribution, such as determining a first trajectory based at least in part on local maximum 502 and a second trajectory based at least in part on local maximum 504.

Figure 5B:
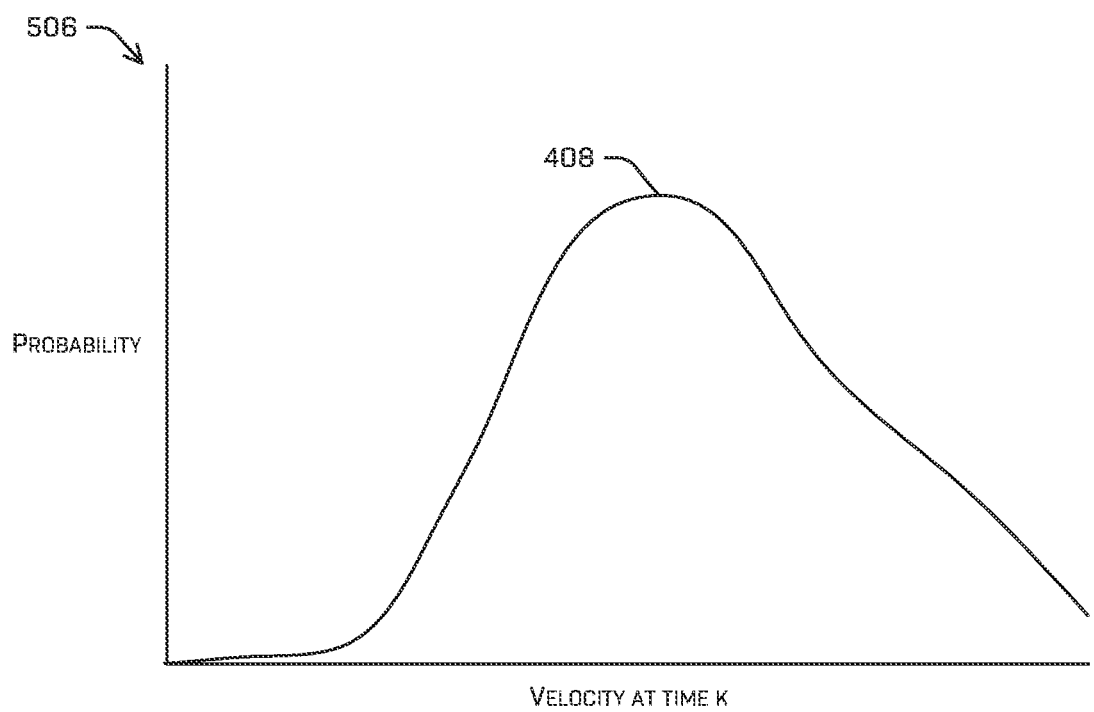
FIG. 5B illustrates an example graph of a velocity distribution that may be generated by the controls distribution generation architecture as part of auto-regressive control generation described herein.

FIG. 5B illustrates an example graph 506 of a velocity distribution that may be generated by the controls distribution generation architecture as part of auto-regressive control generation described herein. The example graph 506 depicts a velocity distribution that might be generated when, at a current time t=0, the vehicle is already moving, so the likelihood of the velocity being zero or near zero (e.g., below 5 miles per hour) is very low and the local maximum 508 may be associated with a velocity that is the same or close to a current velocity of the vehicle.

The example graphs 500 and 506 may depict distributions that may have been generated by the architecture discussed herein in association with one timestep in a series of timesteps up to a horizon. This means different distributions may be generated by the architecture in association with different timesteps up to the time horizon.

Example Process

Figure 6:
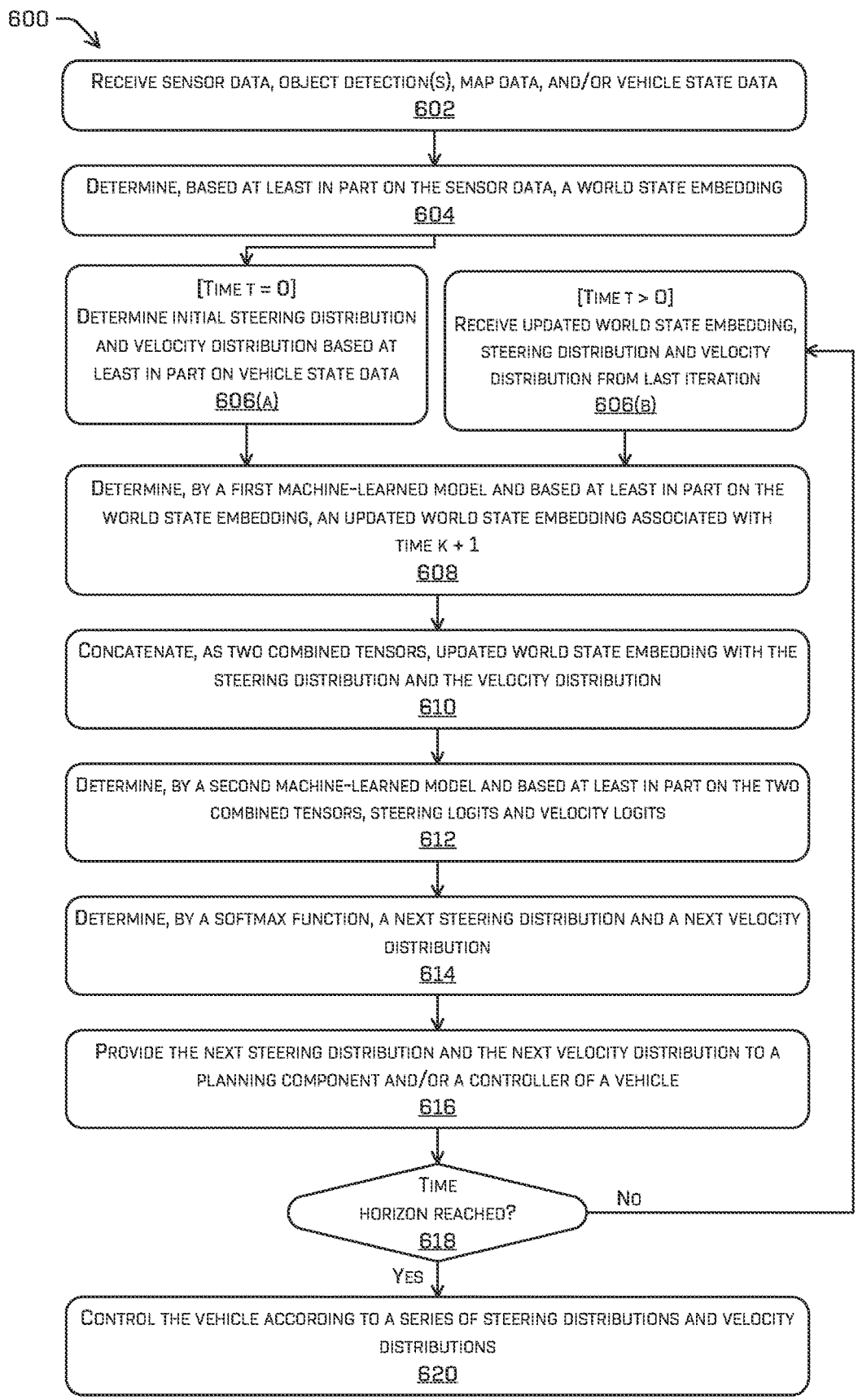
FIG. 6 illustrates a flow diagram of an example processes for determining control distributions for controlling a vehicle.

FIG. 6 illustrates a flow diagram of an example processes 600 for determining control distributions for controlling a vehicle. Example process 600 may be executed by hardware and/or software of a vehicle in one instance, although it is understood that example process 600 may be carried out by hardware and/or software of a remote computing device as part of training for the components discussed herein.

At operation 602, example process 600 may comprise receiving sensor data, according to any of the techniques discussed herein. The sensor data may include, for example, image data, lidar data, radar data, odometry data or other wheel encoder data, GPS signals, and/or the like. In some examples, operation 602 may additionally or alternatively comprise receiving perception data from a perception component of the vehicle. For example, the perception component may use the sensor data to determine object detection(s) associated with dynamic object(s) in the environment. Operation 602 may additionally or alternatively comprise receiving map data indicating data about the local environment, including, for example, roadway locations and extents, sidewalk locations and extents, parking locations, lane locations, signage, static object(s), and/or the like. Operation 602 may additionally or alternatively include receiving vehicle state data, which may be based at least in part on sensor data. The vehicle state data may indicate a current velocity of the vehicle, current steering angle of one or more wheels, current torque, current pose, previous pose(s) and/or velocities, indicator states (e.g., turn indicator state, headlight state), and/or the like.

At operation 604, example process 600 may include determining, based at least in part on the sensor data, a world state embedding, according to any of the techniques discussed herein. In some examples, the world state embedding may be based at least in part on object detection(s), at least part of the map data, and at least part of the vehicle state data. This data may be provided as input to an embedding model that may be trained to project this data into an embedding space, thereby generating the world state embedding. In some examples, the input data (e.g., the object detection(s), vehicle state, and/or map data) may be transformed into a data structure, such as a multi-channel image. For example, such an image may comprise a top-down view of the environment, including portion(s) that indicate object detection(s), salient map data, and/or vehicle location/orientation. The multi-channel portion of the image means that each pixel may be associated with further data in the data structure, such as a state, classification, or the like. In some examples, this data may be encoded as pixel value (how dark or light the pixel is) and/or a pixel may indicate multiple different values, text, and/or vectors. The world state embedding itself may be a vector or tensor that represents this data.

At operation 606, example process 600 may differ depending on whether this is the first iteration of the process where the world state embedding is associated with a current time and no distributions have, as of yet, been generated. For an initial iteration of the process, at time t=0, operation 606 may comprise operation 606(a). For all other iterations of the process, for time(s)/>0, operation 606 may comprise operation 606(b).

At operation 606(a), example process 600 may include determining an initial steering distribution and an initial velocity distribution based at least in part on the current sensor data and/or vehicle state data, according to any of the techniques discussed herein. For example, operation 606(a) may comprise receiving a current steering angle and a current velocity of the vehicle based at least in part on sensor data, which may be indicated as at least part of the vehicle state data, and determining a one-hot vector as the steering angle distribution and a one-hot vector as the current velocity. Additionally or alternatively, the respective vectors may indicate a probability distribution with a broader standard deviation than a one-hot vector, such as a probability distribution having a standard deviation associated with a known error and/or tolerances of the sensors upon which the current steering angle/current velocity were determined.

At operation 606(b), example process 600 may include receiving a steering distribution and velocity distribution from a last iteration of the process, according to any of the techniques discussed herein. For example, to predict the controls distributions for an n-th timestep, the steering distribution and velocity distribution received at 606(b) may be the distributions determined for an n−1th step.

At operation 608, example process 600 may include determining, by a first machine-learned model and based at least in part on the world state embedding (associated with time t=k), an updated world state embedding associated with time k+1, according to any of the techniques discussed herein. For example, the first machine-learned model may include the ML layer(s) 308. These ML layer(s) may be trained to predict a state of the world, including object detection(s), a vehicle state, and map data, as represented by an embedding. Unlike the embedding model used to generate an embedding from the object detection(s), vehicle state, and map data in the first place, the first ML model may receive an embedding as input and may determine a predicted embedding as output.

At operation 610, example process 600 may include concatenating, as two combined tensors, the updated world state embedding to the steering distribution and the velocity distribution, according to any of the techniques discussed herein. In other words, a copy of the updated world state embedding may be made and one copy may be concatenated to the steering distribution and the other copy may be concatenated to the velocity distribution. The distributions may be indicated by vectors and the embedding itself may be vector, so the resultant combined tensor may be a vector or tensor. A first combined tensor may comprise the steering distribution concatenated to the updated world state embedding and a second combined tensor may comprise the steering distribution concatenated to the updated world state embedding. Of course, such concatenations may comprise appending and/or prepending the data in any order.

Additionally or alternatively, in an example where, at operation 612, a single machine-learned model is used, operation 610 may comprise concatenating, as a combined tensor, the updated world state embedding with the steering distribution and the velocity distribution.

At operation 612, example process 600 may include determining, by a second machine-learned model and based at least in part on the combined tensor(s), steering angle logits and velocity logits, according to any of the techniques discussed herein. In an example where operation 612 includes a single machine-learned model, operation 612 may comprise a single ML model that outputs the steering logits and the velocity logits based at least in part on a combined tensor comprising the updated world state embedding, the steering distribution, and the velocity distribution. In another example, the second ML model may comprise a third ML model and a fourth ML model. The third ML model may include the ML model 312 and may be trained to receive the steering combined tensor as input and may be trained to output steering logits. The fourth ML model may include ML model 314 and may be trained to receive the velocity combined tensor as input and may be trained to output velocity logits. The logits output by the third ML model or the fourth ML model may include a vector of logits where a logit maps probability values to any real number. In other words, a logit identifies a probability as a real number between negative infinity to infinity, whereas probabilities may be typically expressed as a number between 0 and 1 or a percentage between 0 and 100%.

At operation 614, example process 600 may include determining, by a softmax function or a softmax layer of the architecture, a next steering distribution and a next velocity distribution associated with time t=k+1, according to any of the techniques discussed herein. The softmax function may convert the logits of the steering logits and velocity logits, respectively, to vectors representing the steering distribution and the velocity distribution. In other words, the softmax layer may convert the steering logits that may comprise a vector of any real numbers to a vector of probabilities (e.g., values between 0 and 1, typically, although probabilities may be indicated in different manners), where each row (or column depending on the setup) and probability is associated with a different steering angle from a maximal leftward steering angle to a maximal rightward steering angle. Similarly, the softmax layer may convert the velocity logits from a vector of real values to a vector of probabilities, each row (or column depending on the setup) of which may associate a probability with a different velocity from 0 to a maximum legal velocity that may be based at least in part on sensor and/or map data.

At operation 616, example process 600 may include the next steering distribution and the next velocity distribution to a planning component and/or a controller of a vehicle, according to any of the techniques discussed herein. In some examples, operation 616 may comprise storing the next steering distribution and the next velocity distribution in a cache of the planning component or the controller. In an additional or alternate example, operation 616 may comprise streaming the next steering distribution and the next velocity distribution to the planning component and/or controller instead of storing the distributions in cache, such as in a publish-subscribe architecture or a data streaming protocol.

At operation 618, example process 600 may include determining whether the time horizon has been reached, according to any of the techniques discussed herein. For example, determining whether the time horizon has been reached may comprise determining whether time k+1 equals the horizon time. For example, where there are 10 timesteps and the horizon time is 2 seconds, the 9th distributions and world state embedding (associated with 1.8 seconds into the future) may be used to generate the 10th distributions (associated with 2 seconds into the future). Since the 10th distributions are associated with the time horizon, 2 seconds, operation 618 determines that the time horizon has been reached.

If the time horizon has been reached, example process 600 may continue to operation 620 ("Yes" prong). If the time horizon has not been reached, example process 600 may return to operation 606(b) ("No" prong). When example process 600 returns to operation 606(b), the distributions received at operation 606(b) are the next steering distribution and next velocity distribution generated at (the most recent iteration of) operations 612 and 614. In addition, at operation 606(b), the updated world state embedding (associated with time k+1) may be received and used at operation 608 as the world state embedding that is input to the first ML model.

At operation 620, example process 600 may include controlling the vehicle according to a series of steering distributions and velocity distributions, according to any of the techniques discussed herein. For example, the series may comprise one or more steering distributions and velocity distributions, each of which may be associated with a different timestep from a current time to a horizon time. In some examples, controlling the vehicle may comprise determining a single trajectory based at least in part on at the series or a portion thereof or determining multiple trajectories based at least in part on at the series or a portion thereof.

In examples where a single trajectory is generated to control the vehicle, at least one steering distribution and velocity distribution of the series and up to all of the distributions in the series may be argmaxed or sampled. In examples where an argmax is used, the maximal probability for each distribution may be determined and the steering and velocity associated with those maximal probabilities may be used to generate the trajectory. For example, the steering angle and velocity are associated with a particular timestep and the trajectory may comprise control instructions sufficient to cause the vehicle to achieve the steering angle and the velocity by the timestep associated with the steering angle and velocity. This may be repeated for one or more of the distributions in the series to generate the entire trajectory and smoothing may be applied to the trajectory to prevent incongruities or passenger discomfort. For example, the smoothing may determine an estimated maximum jerk associated with the trajectory using the control instructions and may alter the trajectory to reduce the estimated jerk if the estimated maximum jerk meets or exceeds a threshold.

In an example where sampling is used, a cross-entropy importance sampling method may iteratively sample the distributions to determine a single trajectory for use. Since cross-entropy importance sampling may be iterative, the process can also be used to generate multiple trajectories by preserving trajectories from multiple iterations of cross-entropy importance sampling.

Additionally or alternatively, the distributions may be randomly sampled to determine controls for constructing the trajectory. As discussed above, such a trajectory(ies) may be smoothed. In some examples, where cross-entropy importance sampling or random sampling is used, the sampled controls (sampled steering angle and velocity for a timestep) for the series may be averaged and weighted with greater weights applied to controls associated with earlier timesteps closer to the current time. These weights may be used as part of trajectory generation using the controls, such as by a tracker portion of a controller that seeks to achieve the vehicle states specified by the controls.

In some examples, where the series of distributions, sampled series of controls (and their weights), and/or multiple trajectories may be provided to the planning component for more complex trajectory selection. For example, the planning component may generate a trajectory based at least in part on a ML model that generates the trajectory using the series of controls and weights as input. Additionally or alternatively, the planning component may comprise a tree search algorithm that searches for a path for controlling the vehicle. For example, the tree search algorithm may include A*, Lifelong Planning A*, D*, D* Lite, Focused D* or a modified version thereof, as discussed in more detail in U.S. patent application Ser. No. 17/394,334, filed Aug. 4, 2021; U.S. Pat. No. 11,485,384, filed May 11, 2020; and U.S. Patent Application Publication No. US 2021-0020045 A1, filed Jul. 19, 2019.

The tree search may be based at least in part on a route indicating a start position and an end position for the vehicle, an occupancy map indicating where static and/or dynamics object(s) are or are predicted to be in the environment, and a set of primitive trajectories. The primitive trajectories may include heuristic or other trajectory "parts," such as maintaining a current steering angle, moving the vehicle in a straight line, turning according to a certain rate or to a certain angle, and/or the like. The one or more trajectories determined based at least in part on the distributions discussed herein may be used to select from among the set of primitive trajectories those trajectories that are the same or similar or the one or more trajectories may themselves be used as part of the tree search. The number of primitive trajectories may be in the tens, hundreds, or thousands so the described technology may massively reduce the time and computational power required to execute an effective tree search that results in a drivable trajectory, enabling such a tree search to be run in real-time on consumer-level hardware.

To give an example, the number of primitive trajectories may be 50 or 100. At 10 timesteps, that means that a naïve system that determines every possible path over 10 timesteps up to a time horizon would need to determine $50^{10}$ or $100^{10}$ possible paths. The techniques discussed herein allow the number of potential paths to be explored to be reduced to $5^{10}$ number of paths in an example where the techniques include generating 5 trajectories using the techniques discussed herein. In some examples, the tree search could also search for a few heuristic paths as well (e.g., such as going straight, maintaining a velocity and/or steering angle of the vehicle, left turn, right turn), so this number might come up to $10^{10}$-$15^{10}$, which still serves as a massive reduction in time, energy, and computational power.

Additionally or alternatively, a beam search may use the distributions to sample a possible trajectory state space, using the distributions as weights to prioritize trajectories having velocities and/or steering angles associated with local, global, near-local, or near-global maxima defined by the distributions discussed herein (where near is defined as being within a standard deviation or a threshold range of a local or global maximum). In some examples, a beam search may include determining a top n number of discrete velocity samples from the velocity distribution and, for each of the velocity distributions, determining a top m number of discrete steering angle samples from the steering angle distribution, resulting in m by n number of combinations where n and m are positive integers that may be the same or different. These combinations may be sorted by combined probability and the top p number of combinations may be provided as input to a tree search or the top result may be chosen as part of the trajectory, where p is a positive integer that may be the same or different than either m or n.

Once a final trajectory has been selected, either as the single trajectory generated from one or more distributions of the series, one of the multiple trajectories as selected by the planning component, or a final trajectory generated based at least in part on a tree search that is based on one or more trajectories generated using distributions of the series, the final trajectory may be provided as input to the controller that actuates the drive system of the vehicle to track the trajectory.

Example Alternate Process

Figure 7:
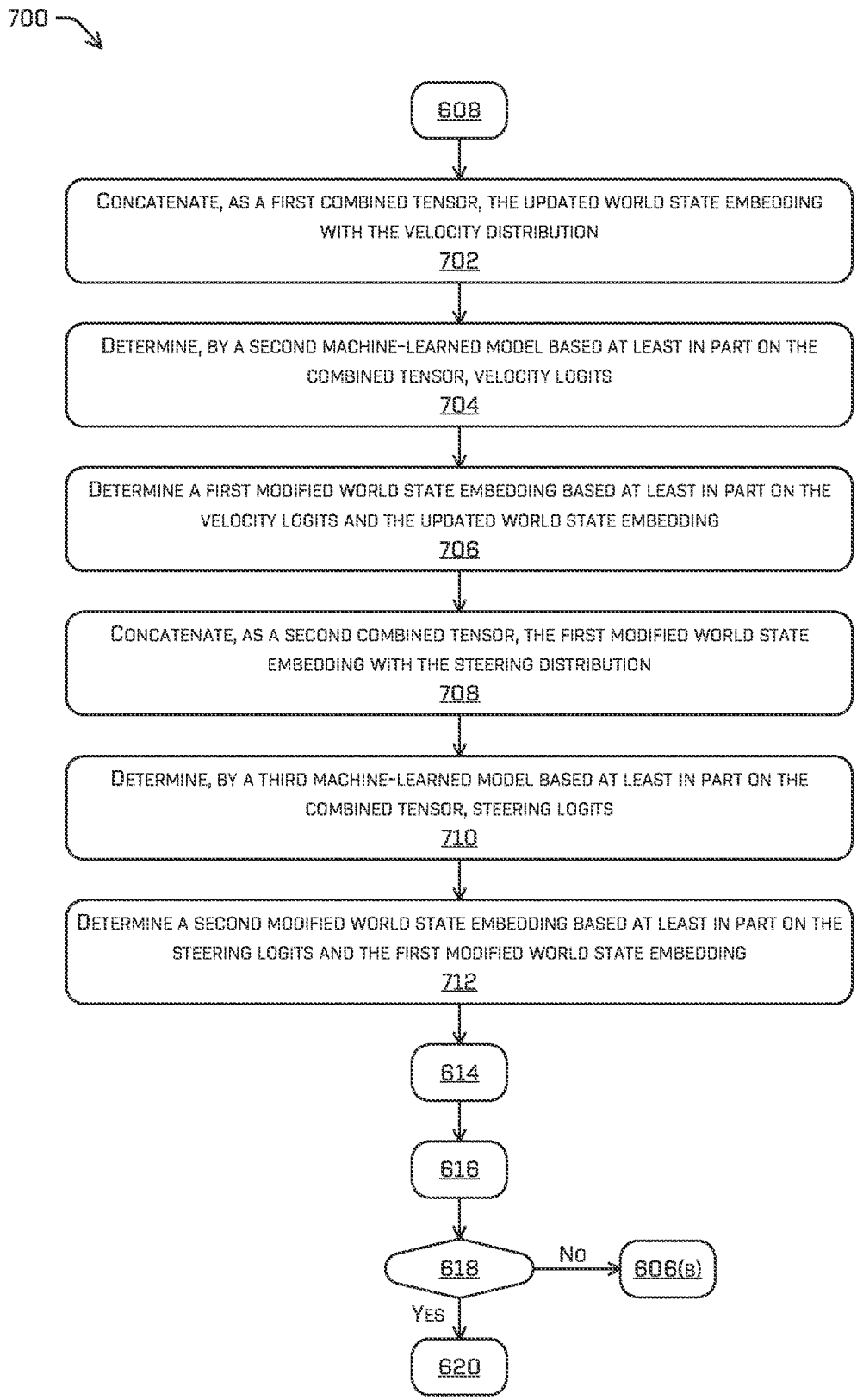
FIG. 7 illustrates a flow diagram of an alternate example processes for determining control distributions for controlling a vehicle.

FIG. 7 illustrates a flow diagram of an alternate example processes for determining control distributions for controlling a vehicle. Example process 700 may be executed by hardware and/or software of a vehicle in one instance, although it is understood that example process 700 may be carried out by hardware and/or software of a remote computing device as part of training for the components discussed herein. In some examples, example process 700 may comprise additionally comprise operations 602, 604, 606(*a*), and 606(*b*) of example process 600, but are left unillustrated for clarity. In some examples, example process 700 may differ from example process 600 at least following operation 608 where an updated world state embedding is determined based at least in part on a current (time=k) world state embedding, which may be the (modified) world state embedding from the last tick (time=k−1). Example process 700 differs in that the updated world state embedding may be modified after the velocity logits are determined and after the steering logits are determined. This allows the steering logits to be determined based at least in part on the velocity logits. Moreover, the updated and modified world state embedding may be further modified based at least in part on the steering logits before the updated and modified world state embedding is used at a next iteration of the process.

At operation 702, example process 700 may comprise concatenating, as a first combined tensor, the updated world state embedding (determined at operation 608) with the velocity distribution, according to any techniques discussed herein. The first combined tensor may comprise the steering distribution concatenated with the updated world state embedding.

At operation 704, example process 700 may comprise determining, by a second machine-learned model based at least in part on the first combined tensor, velocity logits, according to any of the techniques discussed herein.

At operation 706, example process 700 may comprise determining a first modified world state embedding based at least in part on the updated world state embedding and the velocity logits. The way the modified world state embedding may be generated may differ based on whether operation 706 is occurring during training or occurring at inference time. For example, during training, the softmaxed velocity logits (i.e., the velocity distribution) may be concatenated to the updated world state embedding, whereas during inference time, a one-hot vector (i.e., a velocity distribution indicating one velocity with 100% probability) indicating a velocity associated with a maximally probable logit of the velocity logits may be concatenated to the updated world state embedding to determine the first modified world state embedding.

At operation 708, example process 700 may comprise concatenating, as a second combined tensor, the first modified world state embedding with the steering distribution, according to any techniques discussed herein. The second combined tensor may comprise the steering distribution concatenated with the first modified world state embedding.

At operation 710, example process 700 may comprise determining, by a third machine-learned model based at least in part on the second combined tensor, steering logits, according to any of the techniques discussed herein.

At operation 712, example process 700 may comprise determining a second modified world state embedding based at least in part on the first modified world state embedding and the steering logits. The second modified world state embedding may be generated similarly to the first modified world state embedding and may differ based on whether operation 706 is occurring during training or occurring at inference time. For example, during training, the softmaxed steering angle logits (i.e., the steering distribution) may be concatenated to the first modified world state embedding, whereas during inference time, a one-hot vector (i.e., a steering distribution indicating one velocity with 100% probability) indicating a steering angle associated with a maximally probable logit of the steering logits may be concatenated to the first modified world state embedding to determine the second modified world state embedding.

The example process 700 may then continue to operation 614, as described above regarding example process 600 with the one modification that the world state embedding received at operation 606(b) is the second modified world state embedding.

Example Clauses

A: A system comprising: one or more processors; and a memory storing processor-executable instructions that, when executed by the one or more processors, cause the system to perform operations comprising: receiving sensor data; determining, based at least in part on the sensor data, a world state embedding; receiving an initial steering distribution and an initial velocity distribution; determining, by one or more machine-learned layers and based at least in part on the world state embedding, an updated world state embedding associated with a next timestep; combining, as combined data, the initial steering distribution and the updated world state embedding and the initial velocity distribution and the updated world state embedding or the initial steering distribution, the initial velocity distribution, and the updated world state embedding; determining, by a machine-learned model and based at least in part on the combined data, a next steering distribution and a next velocity distribution, wherein the next steering distribution and the next velocity distribution is associated with a first time subsequent to a second time associated with the initial steering distribution and the initial velocity distribution; and controlling a vehicle based at least in part on the next steering distribution and the next velocity distribution.

B: The system of paragraph A, wherein the updated world state embedding is a first updated world state embedding associated with the first time and the operations further comprise: determining, by one or more machine-learned layers and based at least in part on the updated world state embedding, a second updated world state embedding associated with a third time subsequent to the first time; combining, as second combined data, the next steering distribution and the second updated world state embedding and the next velocity distribution and the second updated world state embedding or the next steering distribution, the next velocity distribution, and the second updated world state embedding; and determining, by the machine-learned model and based at least in part on the second combined data, a second next steering distribution and a second next velocity distribution, wherein the second next steering distribution and the next velocity distribution are associated with the third time, wherein controlling the vehicle is additionally based at least in part on the second next steering distribution, the second next velocity distribution.

C: The system of either paragraph A or B, wherein: the machine-learned model comprises a first machine-learned model and a second machine-learned model; the first machine-learned model determines the next steering distribution based at least in part on the initial steering distribution and the updated world state embedding; and the second machine-learned model determines the next velocity distribution based at least in part on the initial velocity distribution and the updated world state embedding.

D: The system of any one of paragraphs A-C, wherein determining the next steering distribution and the next velocity distribution comprises: determining, by the machine-learned model and based at least in part on the initial steering distribution and the updated world state embedding, the steering distribution; modifying, as a first modified world state embedding, the updated world state embedding based at least in part on the steering distribution; determining, by the machine-learned model and based at least in part on the initial velocity distribution and the first modified world state embedding, the velocity distribution; determining, as a second modified world state embedding, the first modified world state embedding based at least in part on the velocity distribution; and providing the second modified world state embedding as input to the one or more machine-learned layers as part of determining controls associated with a third time subsequent to the first time.

E: The system of any one of paragraphs A-D, wherein controlling the vehicle comprises determining, by randomly sampling the next steering distribution and the next velocity distribution, a first steering angle and a first velocity.

F: The system of paragraph E, wherein the first steering angle is a first candidate steering angle and the first velocity is a first candidate velocity and controlling the vehicle further comprises: determining, by randomly sampling the next steering distribution and the next velocity distribution, a second candidate steering angle and a second candidate velocity; and determining a path for the vehicle to follow based at least in part on using the first candidate steering angle, the first candidate velocity, the second candidate steering angle, and the second candidate velocity to determine a subset of trajectories to explore in a tree search.

G: The system of any one of paragraphs A-F, wherein controlling the vehicle comprises: determining a steering angle based at least in part on determining that the steering angle is associated with a first maximum probability indicated by the next steering distribution; and determining a velocity based at least in part on determining that the velocity is associated with a second maximum probability indicated by the next velocity distribution.

H: A method comprising: receiving sensor data; determining, based at least in part on the sensor data, a world state embedding; receiving an initial steering distribution and an initial velocity distribution; determining, by one or more machine-learned layers and based at least in part on the world state embedding, an updated world state embedding associated with a next timestep; combining, as combined data, the initial steering distribution and the updated world state embedding and the initial velocity distribution and the updated world state embedding or the initial steering distribution, the initial velocity distribution, and the updated world state embedding; determining, by a machine-learned model and based at least in part on the combined data, a next steering distribution and a next velocity distribution associated with the next timestep; and controlling a vehicle based at least in part on the next steering distribution and the next velocity distribution.

I: The method of paragraph H, wherein the updated world state embedding is a first updated world state embedding associated with a first time, the next steering distribution and the next velocity distribution are associated with the first time, and the method further comprises: determining, by one or more machine-learned layers and based at least in part on the updated world state embedding, a second updated world state embedding associated with a second time subsequent to the first time; combining, as second combined data, the next steering distribution and the second updated world state embedding and the next velocity distribution and the second updated world state embedding or the next steering distribution, the next velocity distribution, and the second updated world state embedding; and determining, by the machine-learned model and based at least in part on the second combined data, a second next steering distribution and a second next velocity distribution, wherein the second next steering distribution and the next velocity distribution are associated with the second time, wherein controlling the vehicle is additionally based at least in part on the second next steering distribution, the second next velocity distribution.

J: The method of either paragraph H or I, wherein: the machine-learned model comprises a first machine-learned model and a second machine-learned model; the first machine-learned model determines the next steering distribution based at least in part on the initial steering distribution and the updated world state embedding; and the second machine-learned model determines the next velocity distribution based at least in part on the initial velocity distribution and the updated world state embedding.

K: The method of any one of paragraphs H-J, wherein the next steering distribution and the next velocity distribution are associated with a first time and determining the next steering distribution and the next velocity distribution comprises: determining, by the machine-learned model and based at least in part on the initial steering distribution and the updated world state embedding, the steering distribution; modifying, as a first modified world state embedding, the updated world state embedding based at least in part on the steering distribution; determining, by the machine-learned model and based at least in part on the initial velocity distribution and the first modified world state embedding, the velocity distribution; determining, as a second modified world state embedding, the first modified world state embedding based at least in part on the velocity distribution; and providing the second modified world state embedding as input to the one or more machine-learned layers as part of determining controls associated with a second time subsequent to the first time.

L: The method of any one of paragraphs H-K, wherein controlling the vehicle comprises determining, by randomly sampling the next steering distribution and the next velocity distribution, a first steering angle and a first velocity.

M: The method of paragraph L, wherein the first steering angle is a first candidate steering angle and the first velocity is a first candidate velocity and controlling the vehicle further comprises: determining, by randomly sampling the next steering distribution and the next velocity distribution, a second candidate steering angle and a second candidate velocity; and determining a path for the vehicle to follow based at least in part on using the first candidate steering angle, the first candidate velocity, the second candidate steering angle, and the second candidate velocity to determine a subset of trajectories to explore in a tree search.

N: The method of any one of paragraphs H-M, wherein controlling the vehicle comprises: determining a steering angle based at least in part on determining that the steering angle is associated with a first maximum probability indicated by the next steering distribution; and determining a velocity based at least in part on determining that the velocity is associated with a second maximum probability indicated by the next velocity distribution.

O: A non-transitory computer-readable medium storing processor-executable instructions that, when executed by one or more processors, cause the one or more processors to perform operations comprising: receiving sensor data; determining, based at least in part on the sensor data, a world state embedding; receiving an initial steering distribution and an initial velocity distribution; determining, by one or more machine-learned layers and based at least in part on the world state embedding, an updated world state embedding associated with a next timestep; combining, as combined data, the initial steering distribution and the updated world state embedding and the initial velocity distribution and the updated world state embedding or the initial steering distribution, the initial velocity distribution, and the updated world state embedding; determining, by a machine-learned model and based at least in part on the combined data, a next steering distribution and a next velocity distribution associated with the next timestep; and controlling a vehicle based at least in part on the next steering distribution and the next velocity distribution.

P: The non-transitory computer-readable medium of paragraph O, wherein the updated world state embedding is a first updated world state embedding associated with a first time, the next steering distribution and the next velocity distribution are associated with the first time, and the operations further comprise: determining, by one or more machine-learned layers and based at least in part on the updated world state embedding, a second updated world state embedding associated with a second time subsequent to the first time; combining, as second combined data, the next steering distribution and the second updated world state embedding and the next velocity distribution and the second updated world state embedding or the next steering distribution, the next velocity distribution, and the second updated world state embedding; and determining, by the machine-learned model and based at least in part on the second combined data, a second next steering distribution and a second next velocity distribution, wherein the second next steering distribution and the next velocity distribution are associated with the second time, wherein controlling the vehicle is additionally based at least in part on the second next steering distribution, the second next velocity distribution.

Q: The non-transitory computer-readable medium of either paragraph O or P, wherein: the machine-learned model comprises a first machine-learned model and a second machine-learned model; the first machine-learned model determines the next steering distribution based at least in part on the initial steering distribution and the updated world state embedding; and the second machine-learned model determines the next velocity distribution based at least in part on the initial velocity distribution and the updated world state embedding.

R: The non-transitory computer-readable medium of any one of paragraphs O-Q, wherein controlling the vehicle comprises determining, by randomly sampling the next steering distribution and the next velocity distribution, a first steering angle and a first velocity.

S: The non-transitory computer-readable medium of paragraph R, wherein the first steering angle is a first candidate steering angle and the first velocity is a first candidate velocity and controlling the vehicle further comprises: determining, by randomly sampling the next steering distribution and the next velocity distribution, a second candidate steering angle and a second candidate velocity; and determining a path for the vehicle to follow based at least in part on using the first candidate steering angle, the first candidate velocity, the second candidate steering angle, and the second candidate velocity to determine a subset of trajectories to explore in a tree search.

T: The non-transitory computer-readable medium of any one of paragraphs O-S, wherein controlling the vehicle comprises: determining a steering angle based at least in part on determining that the steering angle is associated with a first maximum probability indicated by the next steering distribution; and determining a velocity based at least in part on determining that the velocity is associated with a second maximum probability indicated by the next velocity distribution.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
a memory storing processor-executable instructions that, when executed by the one or more processors, cause the system to perform operations comprising:
receiving sensor data;
determining, based at least in part on the sensor data, a world state embedding;
receiving an initial steering distribution and an initial velocity distribution;
determining, by one or more machine-learned layers and based at least in part on the world state embedding, an updated world state embedding associated with a next timestep;
combining, as combined data, the initial steering distribution and the updated world state embedding and the initial velocity distribution and the updated world state embedding or the initial steering distribution, the initial velocity distribution, and the updated world state embedding;
determining, by a machine-learned model and based at least in part on the combined data, a next steering distribution and a next velocity distribution, wherein the next steering distribution and the next velocity distribution is associated with a first time subsequent to a second time associated with the initial steering distribution and the initial velocity distribution; and
controlling a vehicle based at least in part on the next steering distribution and the next velocity distribution, wherein controlling the vehicle comprises determining, by randomly sampling the next steering distribution and the next velocity distribution, a first steering angle and a first velocity.

2. The system of claim 1, wherein the updated world state embedding is a first updated world state embedding associated with the first time and the operations further comprise:
determining, by the one or more machine-learned layers and based at least in part on the updated world state embedding, a second updated world state embedding associated with a third time subsequent to the first time;
combining, as second combined data, the next steering distribution and the second updated world state embedding and the next velocity distribution and the second updated world state embedding or the next steering distribution, the next velocity distribution, and the second updated world state embedding; and
determining, by the machine-learned model and based at least in part on the second combined data, a second next steering distribution and a second next velocity distribution, wherein the second next steering distribution and the next velocity distribution are associated with the third time,
wherein controlling the vehicle is additionally based at least in part on the second next steering distribution, the second next velocity distribution.

3. The system of claim 1, wherein:
the machine-learned model comprises a first machine-learned model and a second machine-learned model;
the first machine-learned model determines the next steering distribution based at least in part on the initial steering distribution and the updated world state embedding; and
the second machine-learned model determines the next velocity distribution based at least in part on the initial velocity distribution and the updated world state embedding.

4. The system of claim 1, wherein determining the next steering distribution and the next velocity distribution comprises:
determining, by the machine-learned model and based at least in part on the initial steering distribution and the updated world state embedding, the next steering distribution;
modifying, as a first modified world state embedding, the updated world state embedding based at least in part on the next steering distribution;
determining, by the machine-learned model and based at least in part on the initial velocity distribution and the first modified world state embedding, the next velocity distribution;
determining, as a second modified world state embedding, the first modified world state embedding based at least in part on the next velocity distribution; and
providing the second modified world state embedding as input to the one or more machine-learned layers as part of determining controls associated with a third time subsequent to the first time.

5. The system of claim 1, wherein the first steering angle is a first candidate steering angle and the first velocity is a first candidate velocity and controlling the vehicle further comprises:
determining, by randomly sampling the next steering distribution and the next velocity distribution, a second candidate steering angle and a second candidate velocity; and determining a path for the vehicle to follow based at least in part on using the first candidate steering angle, the first candidate velocity, the second candidate steering angle, and the second candidate velocity to determine a subset of trajectories to explore in a tree search.

6. The system of claim 1, wherein controlling the vehicle comprises:
   determining a steering angle based at least in part on determining that the steering angle is associated with a first maximum probability indicated by the next steering distribution; and
   determining a velocity based at least in part on determining that the velocity is associated with a second maximum probability indicated by the next velocity distribution.

7. The system of claim 1, the operations further comprising:
   inputting the sensor data to a machine learned model; and
   receiving, from the machine learned model, the world state embedding.

8. A method comprising:
   receiving sensor data;
   determining, based at least in part on the sensor data, a world state embedding;
   receiving an initial steering distribution and an initial velocity distribution;
   determining, by one or more machine-learned layers and based at least in part on the world state embedding, an updated world state embedding associated with a next timestep;
   combining, as combined data, the initial steering distribution and the updated world state embedding and the initial velocity distribution and the updated world state embedding or the initial steering distribution, the initial velocity distribution, and the updated world state embedding;
   determining, by a machine-learned model and based at least in part on the combined data, a next steering distribution and a next velocity distribution associated with the next timestep; and
   controlling a vehicle based at least in part on the next steering distribution and the next velocity distribution, wherein controlling the vehicle comprises determining, by randomly sampling the next steering distribution and the next velocity distribution, a first steering angle and a first velocity.

9. The method of claim 8, wherein the updated world state embedding is a first updated world state embedding associated with a first time, the next steering distribution and the next velocity distribution are associated with the first time, and the method further comprises:
   determining, by the one or more machine-learned layers and based at least in part on the updated world state embedding, a second updated world state embedding associated with a second time subsequent to the first time;
   combining, as second combined data, the next steering distribution and the second updated world state embedding and the next velocity distribution and the second updated world state embedding or the next steering distribution, the next velocity distribution, and the second updated world state embedding; and
   determining, by the machine-learned model and based at least in part on the second combined data, a second next steering distribution and a second next velocity distribution, wherein the second next steering distribution and the next velocity distribution are associated with the second time,
   wherein controlling the vehicle is additionally based at least in part on the second next steering distribution, the second next velocity distribution.

10. The method of claim 8, wherein:
    the machine-learned model comprises a first machine-learned model and a second machine-learned model;
    the first machine-learned model determines the next steering distribution based at least in part on the initial steering distribution and the updated world state embedding; and
    the second machine-learned model determines the next velocity distribution based at least in part on the initial velocity distribution and the updated world state embedding.

11. The method of claim 8, wherein the next steering distribution and the next velocity distribution are associated with a first time and determining the next steering distribution and the next velocity distribution comprises:
    determining, by the machine-learned model and based at least in part on the initial steering distribution and the updated world state embedding, the next steering distribution;
    modifying, as a first modified world state embedding, the updated world state embedding based at least in part on the next steering distribution;
    determining, by the machine-learned model and based at least in part on the initial velocity distribution and the first modified world state embedding, the next velocity distribution;
    determining, as a second modified world state embedding, the first modified world state embedding based at least in part on the next velocity distribution; and
    providing the second modified world state embedding as input to the one or more machine-learned layers as part of determining controls associated with a second time subsequent to the first time.

12. The method of claim 8, wherein the first steering angle is a first candidate steering angle and the first velocity is a first candidate velocity and controlling the vehicle further comprises:
    determining, by randomly sampling the next steering distribution and the next velocity distribution, a second candidate steering angle and a second candidate velocity; and
    determining a path for the vehicle to follow based at least in part on using the first candidate steering angle, the first candidate velocity, the second candidate steering angle, and the second candidate velocity to determine a subset of trajectories to explore in a tree search.

13. The method of claim 8, wherein controlling the vehicle comprises:
    determining a steering angle based at least in part on determining that the steering angle is associated with a first maximum probability indicated by the next steering distribution; and
    determining a velocity based at least in part on determining that the velocity is associated with a second maximum probability indicated by the next velocity distribution.

14. The method of claim 8, further comprising:
    inputting the sensor data to a machine learned model; and
    receiving, from the machine learned model, the world state embedding.

15. A non-transitory computer-readable medium storing processor-executable instructions that, when executed by one or more processors, cause the one or more processors to perform operations comprising:
- receiving sensor data;
- determining, based at least in part on the sensor data, a world state embedding;
- receiving an initial steering distribution and an initial velocity distribution;
- determining, by one or more machine-learned layers and based at least in part on the world state embedding, an updated world state embedding associated with a next timestep;
- combining, as combined data, the initial steering distribution and the updated world state embedding and the initial velocity distribution and the updated world state embedding or the initial steering distribution, the initial velocity distribution, and the updated world state embedding;
- determining, by a machine-learned model and based at least in part on the combined data, a next steering distribution and a next velocity distribution associated with the next timestep; and
- controlling a vehicle based at least in part on the next steering distribution and the next velocity distribution, wherein controlling the vehicle comprises determining, by randomly sampling the next steering distribution and the next velocity distribution, a first steering angle and a first velocity.

16. The non-transitory computer-readable medium of claim 15, wherein the updated world state embedding is a first updated world state embedding associated with a first time, the next steering distribution and the next velocity distribution are associated with the first time, and the operations further comprise:
- determining, by the one or more machine-learned layers and based at least in part on the updated world state embedding, a second updated world state embedding associated with a second time subsequent to the first time;
- combining, as second combined data, the next steering distribution and the second updated world state embedding and the next velocity distribution and the second updated world state embedding or the next steering distribution, the next velocity distribution, and the second updated world state embedding; and
- determining, by the machine-learned model and based at least in part on the second combined data, a second next steering distribution and a second next velocity distribution, wherein the second next steering distribution and the next velocity distribution are associated with the second time,
- wherein controlling the vehicle is additionally based at least in part on the second next steering distribution, the second next velocity distribution.

17. The non-transitory computer-readable medium of claim 15, wherein:
- the machine-learned model comprises a first machine-learned model and a second machine-learned model;
- the first machine-learned model determines the next steering distribution based at least in part on the initial steering distribution and the updated world state embedding; and
- the second machine-learned model determines the next velocity distribution based at least in part on the initial velocity distribution and the updated world state embedding.

18. The non-transitory computer-readable medium of claim 15, wherein the first steering angle is a first candidate steering angle and the first velocity is a first candidate velocity and controlling the vehicle further comprises:
- determining, by randomly sampling the next steering distribution and the next velocity distribution, a second candidate steering angle and a second candidate velocity; and
- determining a path for the vehicle to follow based at least in part on using the first candidate steering angle, the first candidate velocity, the second candidate steering angle, and the second candidate velocity to determine a subset of trajectories to explore in a tree search.

19. The non-transitory computer-readable medium of claim 15, wherein controlling the vehicle comprises:
- determining a steering angle based at least in part on determining that the steering angle is associated with a first maximum probability indicated by the next steering distribution; and
- determining a velocity based at least in part on determining that the velocity is associated with a second maximum probability indicated by the next velocity distribution.

20. The non-transitory computer-readable medium of claim 15, the operations further comprising:
- inputting the sensor data to a machine learned model; and
- receiving, from the machine learned model, the world state embedding.

* * * * *